United States Patent
Kim

(10) Patent No.: US 6,549,251 B2
(45) Date of Patent: Apr. 15, 2003

(54) LCD HAVING BARRIER LAYER IN SAME PLANE AS GATE ELECTRODE AND METHOD OF FABRICATING

(75) Inventor: Hong-Jin Kim, Kyoungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 8 days.

(21) Appl. No.: 09/891,230

(22) Filed: Jun. 26, 2001

(65) Prior Publication Data

US 2002/0021379 A1 Feb. 21, 2002

(30) Foreign Application Priority Data

Jul. 12, 2000 (KR) .......................... 2000-40005

(51) Int. Cl.$^7$ ............................. G02F 1/136
(52) U.S. Cl. ................. 349/43; 257/59; 349/46
(58) Field of Search ............... 349/42, 43, 46, 349/122; 257/59, 72

(56) References Cited

U.S. PATENT DOCUMENTS 5,193,017 A * 3/1993 Iwai et al. ................. 349/43
5,644,370 A * 7/1997 Miyawaki et al. ........... 349/43
5,818,550 A * 10/1998 Kadota et al. .............. 349/43

\* cited by examiner

*Primary Examiner*—Toan Ton
(74) *Attorney, Agent, or Firm*—Morgan, Lewis & Bockius LLP

(57) ABSTRACT

An array substrate for a liquid crystal display device, the array substrate including a substrate, a gate line including a gate electrode disposed upon the substrate, a data line disposed upon the substrate and formed orthogonal to the gate line, a barrier disposed upon the substrate and spaced apart from the gate electrode and the data line, a gate insulating layer disposed upon the substrate to cover the gate line, the gate electrode, and the barrier, an active layer disposed upon the gate insulating layer and over the gate electrode, a source electrode disposed upon the active layer, a drain electrode having a first portion disposed upon the active layer opposite to the source electrode, and a second portion disposed upon the insulating layer to cross over the barrier, a pixel region defined by a cross of the gate line and the data line, and a pixel electrode electrically connected to the second portion of the drain electrode.

17 Claims, 18 Drawing Sheets

LCD HAVING BARRIER LAYER IN SAME PLANE AS GATE ELECTRODE AND METHOD OF FABRICATING

This application claims the benefit of Korean Patent Application No. 2000-40005, filed Jul. 12, 2000 in Korea, which is hereby incorporated by reference.

BACKGROUND OF THE INVENTION

1. Field of the Invention

The present invention relates to an active-matrix liquid crystal display (LCD) device and a method of fabricating the same, and more particularly, to an array substrate having thin film transistors (TFTs) for the active-matrix LCD device and the method of fabricating the array substrate.

2. Discussion of the Related Art

A LCD device makes use of optical anisotropy to display images. A typical LCD device includes an upper substrate, a lower substrate, and a liquid crystal material interposed therebetween.

FIG. 1 is an exploded perspective view showing a typical LCD device 11 including an upper substrate 5 and an opposing lower substrate 22 and a liquid crystal layer 14 interposed therebetween. The upper substrate 5 and the lower substrates 22 are alternatively called a color filter substrate and an array substrate, respectively. On the upper substrate 5, a black matrix 6 and a color filter layer 7 that includes a plurality of sub-color-filters red (R), green (G), and blue (B) are formed. The black matrix 6 surrounds each sub-color-filter, thereby forming an array matrix. Further on the upper substrate 5, a common electrode 18 is formed to cover the color filter layer 7 and the black matrix 6.

On the lower substrate 22 opposing the upper substrate 5, a thin film transistor (TFT) "T" is formed to function a switching element in the shape of an array matrix corresponding to the color filter layer 7. In addition, a plurality of crossing gate lines 13 and data lines 15 are positioned such that the TFT "T" is located proximate to each crossing portion of the gate line 13 and the data line 15. The crossing gate line 15 and the data line 15 define a pixel region "P". In the pixel region "P", a pixel electrode 17 is disposed and is made of a transparent conductive material, usually indium tin oxide (ITO), for example.

Liquid crystal molecules of the liquid crystal layer 14 are aligned in accordance with electric signals applied by the TFT "T", thereby controlling transmission of incident rays of light to form a display image. Specifically, the gate line 13 and the data line 15 apply electric signals to a gate electrode and a source electrode of the TFT "T," respectively. The signal applied to the drain electrode is transmitted to the pixel electrode 17 in order to align the liquid crystal molecules of the liquid crystal layer 14. Subsequently, rays of backlight (not shown) selectively pass through the liquid crystal layer 14 such that an image is displayed. A fabricating process of the array substrate requires repeated steps of deposition, photolithography, etching, and stripping for various layers.

In practice, an inverted staggered type TFT is widely deployed due to its simplicity and high quality and can be classified as either a back-channel-etch type or an etching-stopper type, based on the method of forming a channel. The etch-stopper type TFT is alternatively referred to as a channel-passivated type, because it further includes a channel passivation layer that protects the channel of the TFT. More processes are required for fabricating the etch-stopper type TFT because of the channel passivation layer. However, the channel passivation layer effectively decreases passage of electrons across the channel, thereby improving operational quality. In addition, because the channel passivation layer protects the channel from being over-etched during fabrication, generation of defects within the channel is prevented.

FIG. 2 shows an array substrate of a liquid crystal display device implementing a conventional inverted staggered type TFT. As shown, the array substrate 22 includes a pixel region "P" defined by crossing gate line 13 and data line 15, and includes a TFT "T", a pixel electrode 17, and a storage capacitor "C." The TFT "T" includes a gate electrode 26, a source electrode 28, a drain electrode 30, and an active layer 55. An island-shaped channel passivation layer 57 is disposed upon the active layer 55, and is made of an insulating material. The source electrode 28 electrically connects with the data line 15, the gate electrode 26 electrically connects with the gate line 13, and the pixel electrode 17 directly contacts the drain electrode 30.

Referring now to FIGS. 3A to 6A and 3B to 6B, a method for fabricating the conventional array substrate will now be explained. FIGS. 3A to 6A are sequential plan views showing the array substrate during the fabrication process, and FIGS. 3B to 6B are cross-sectional views taken along a line "III—III" of FIG. 2. FIGS. 3B to 6B correspond to FIGS. 3A to 6A, respectively.

In FIGS. 3A and 3B, a surface of a substrate 22 is cleaned to remove particles and/or contaminants. Then, a first metal layer is deposited upon the substrate 22 using a sputtering process, for example, and is subsequently patterned using a first mask to integrally form a gate electrode 26 and a gate line 13. At this point, a portion of the gate line 13 is used as a first capacitor electrode 13a of the storage capacitor "C" shown in FIG. 2. Aluminum (Al) is widely used as the material with which to form the gate electrode 26 for decreasing RC delay. However, pure aluminum is chemically weak and may result in the formation of hillocks during high-temperature processing. Accordingly, instead of pure aluminum, aluminum alloys or layered aluminum structures are used to form the gate electrode. As mentioned above, the gate electrode 26 and the first capacitor electrode 13a are usually made of the same metal layer as the gate line 13. After the first metal layer is patterned, a gate insulating layer 50 is formed to cover the first metal layer. Then, an amorphous silicon layer (a-Si:H) 55 and an insulating layer 57 are sequentially formed upon the gate insulating layer 50.

In FIGS. 4A and 4B, the insulating layer 57 is patterned to form an island-shaped channel passivation layer 57a disposed over the gate electrode 26. Then, a doped amorphous silicon is deposited upon the channel passivation layer 57a and the amorphous silicon layer 55 (in FIG. 3B). The doped amorphous silicon layer and the amorphous silicon layer are patterned together to form an island-shaped ohmic contact layer 58 and an active layer 55a with the channel passivation layer 57a interposed therebetween.

Thereafter, as shown in FIGS. 5A and 5B, a second metal layer is deposited upon the array substrate 22 and subsequently patterned to form a data line 15, a source electrode 28, and a drain electrode 30. The data line 15 crosses with the gate line 13 to define a pixel region "P." The source electrode 28 and the drain electrode 30 are spaced apart from each other and formed to overlap the gate electrode 26 with the active layer 55a interposed therebetween.

As shown in FIGS. 6A and 6B, a transparent conductive material is deposited upon the array substrate 22 and subsequently patterned to form a pixel electrode 17 disposed in the pixel region "P." The transparent conductive material is preferably selected from a group including at least indium tin oxide (ITO) and indium zinc oxide (IZO), for example. The pixel electrode 17 electrically contacts the drain electrode 30 at a drain edge portion "D" and a portion of the pixel electrode 17 overlaps the first capacitor electrode 13a and functions as a second capacitor electrode 17a. The first capacitor electrode 13a and the second capacitor electrode 17a compose the storage capacitor "C." Thereafter, a passivation layer 60 is formed to cover an entire surface of the array substrate 22 having the pixel electrode 17.

During the above fabrication processes, the pixel electrode 17 is usually patterned using a wet etching method. However, when an etchant is used for patterning the pixel electrode 17, the etchant may abnormally penetrate along a boundary line "E" (in FIG. 6A) between the pixel electrode 17 and the drain electrode 30. Accordingly, the etchant over-etches the pixel electrode 17 along the boundary line "E" (in FIG. 6A) such that the pixel electrode 17 is electrically separated from the drain electrode 30, thereby creating a point defect within a display area of the LCD device.

SUMMARY OF THE INVENTION

Accordingly, the present invention is directed to a method of fabricating an LCD device that substantially obviates one or more of problems due to limitations and disadvantages of the related art.

An object of the present invention is to provide an improved method of fabricating an array substrate for an LCD device such that an open-line defect between a pixel electrode and a drain electrode is prevented.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate of a liquid crystal display device includes a substrate, a gate line including a gate electrode disposed on the substrate along a first direction, a data line disposed on the substrate along a second direction, a barrier disposed on the substrate and spaced apart from the gate electrode and the data line, a gate insulating layer disposed on the substrate, the gate line, the gate electrode, and the barrier, an active layer disposed on the gate insulating layer over the gate electrode, a source electrode disposed on the active layer, a drain electrode having a first portion disposed on the active layer opposite to the source electrode, and a second portion disposed on the insulating layer crossing over the barrier; a pixel region defined by a cross of the gate line and the data line, and a pixel electrode electrically connected to the second portion of the drain electrode.

In another aspect, the present invention provides a method of fabricating an array substrate for a liquid crystal display device. The method includes the steps of forming a first metal layer including a gate line, a gate electrode, and a barrier upon a substrate, wherein the barrier is spaced apart from the gate electrode, forming a gate insulating layer to cover the first metal layer, forming an amorphous silicon layer upon the gate insulating layer, forming a doped amorphous silicon layer upon the amorphous silicon layer, forming both an island-shaped active layer from the amorphous silicon layer and an island-shaped ohmic contact layer from the doped amorphous silicon layer that are disposed over the gate electrode, forming a second metal layer including a data line, a source electrode, and a drain electrode, the drain electrode having a first portion disposed upon the ohmic contact layer and a second portion disposed upon the gate insulating layer and over the barrier, and forming a pixel electrode to overlap the second portion of the drain electrode such that the pixel electrode electrically contacts the drain electrode.

In another aspect, the present invention provides a liquid crystal display device including a thin film transistor formed upon a substrate, the thin film transistor including a source electrode, a drain electrode, an active layer, and a gate electrode, and at least one barrier formed upon the substrate beneath the drain electrode, wherein the barrier is disposed between an end portion of the drain electrode and an end portion of the active layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 3A to 6A are sequential plan views showing a conventional method for fabricating the array substrate of FIG. 2;

FIGS. 3B to 6B are cross-sectional views taken along line III—III of FIGS. 3A to 6A, respectively;

FIGS. 8A to 11A are plan views showing a sequence of fabricating the array substrate of FIG. 7A;

FIGS. 8B to 11B are cross-sectional views taken along line V—V of FIGS. 8A to 11A, respectively;

DETAILED DESCRIPTION OF THE PREFERRED EMBODIMENTS

Reference will now be made in detail to the preferred embodiments of the present invention, examples of which are illustrated in the accompanying drawings.

Figure 1:
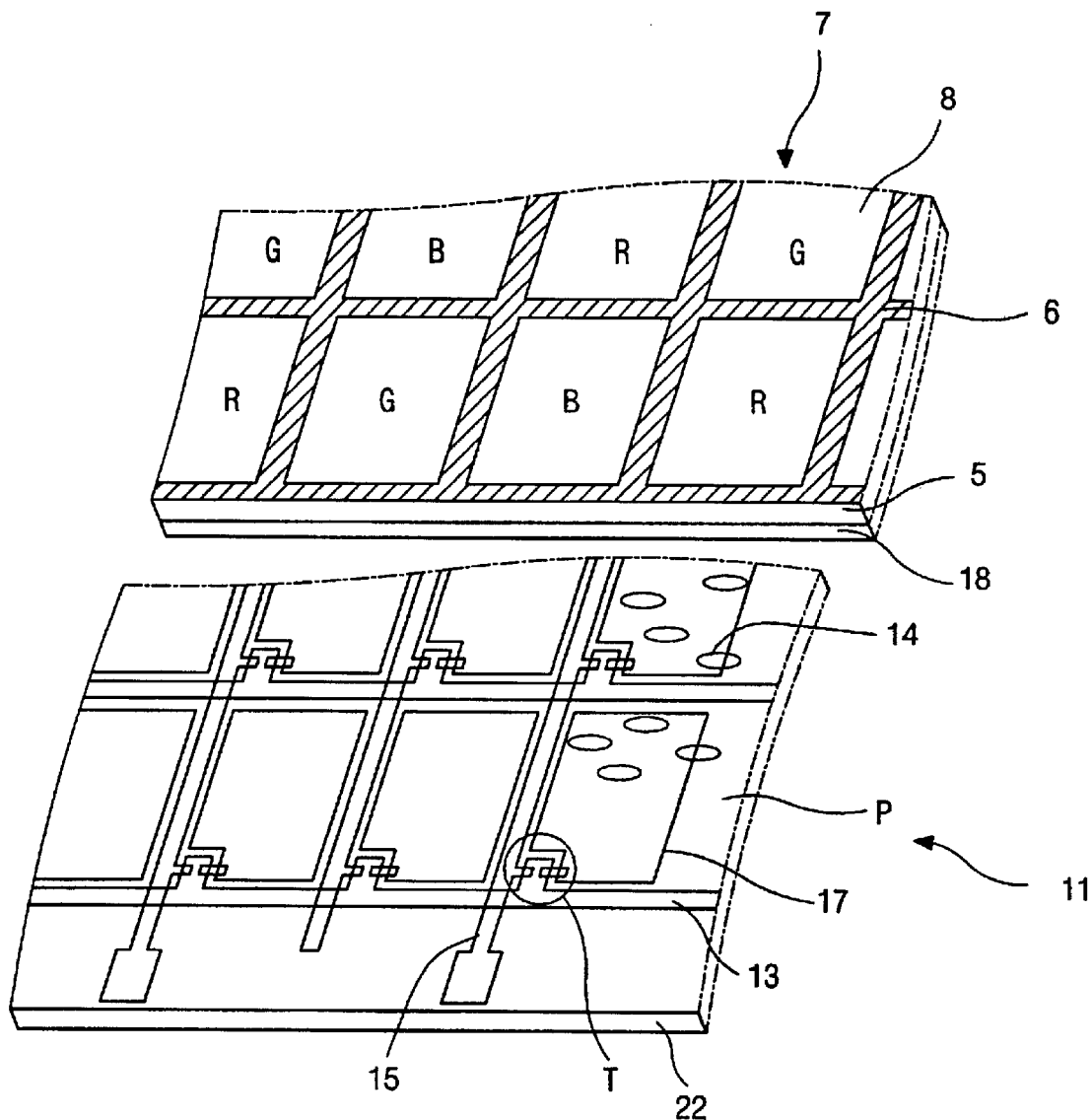
FIG. 1 is an exploded perspective view showing a typical LCD device.
Figure 2:
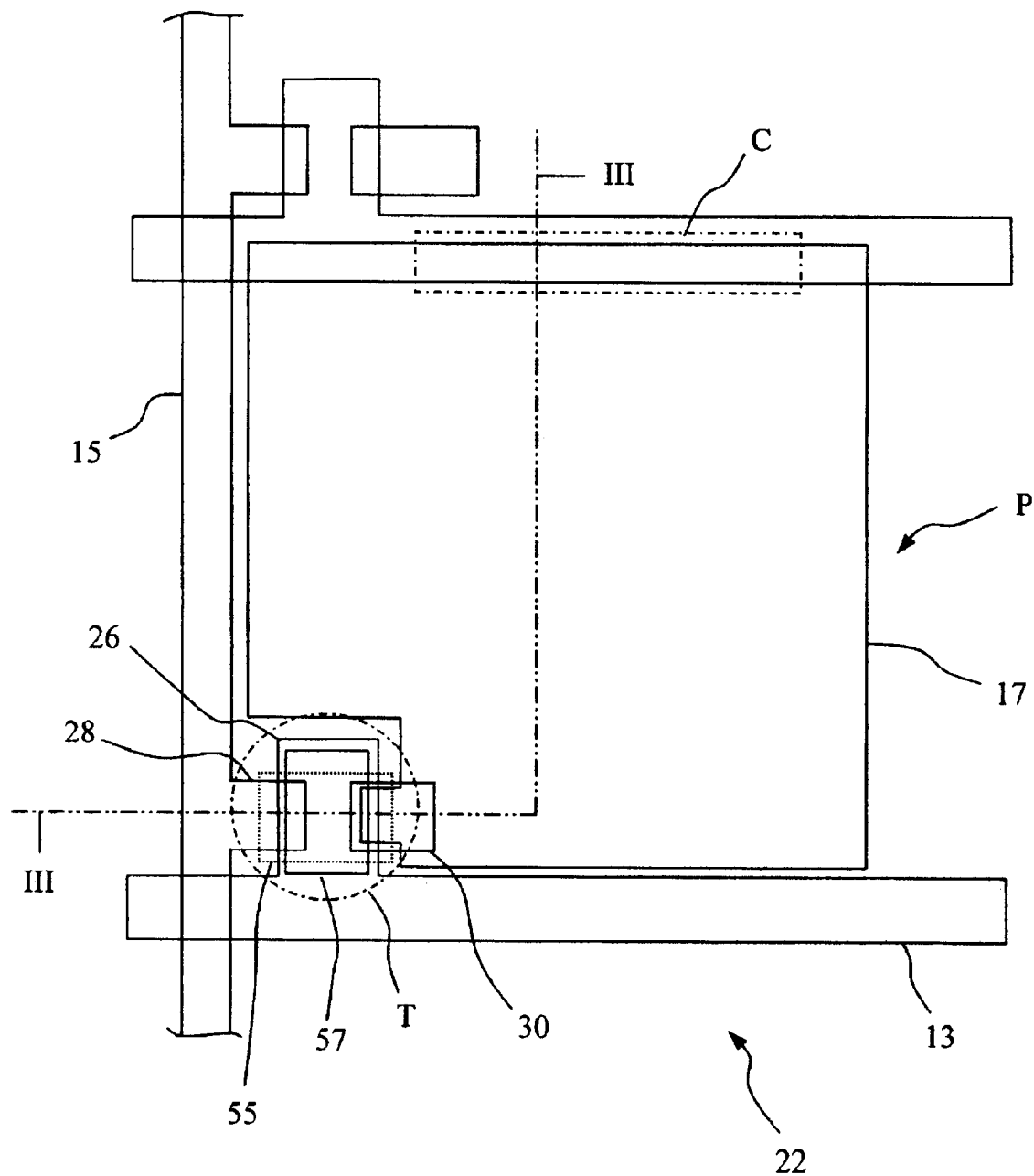
FIG. 2 is a plan view showing an array substrate of an LCD device according to the related art.
Figure 3A:
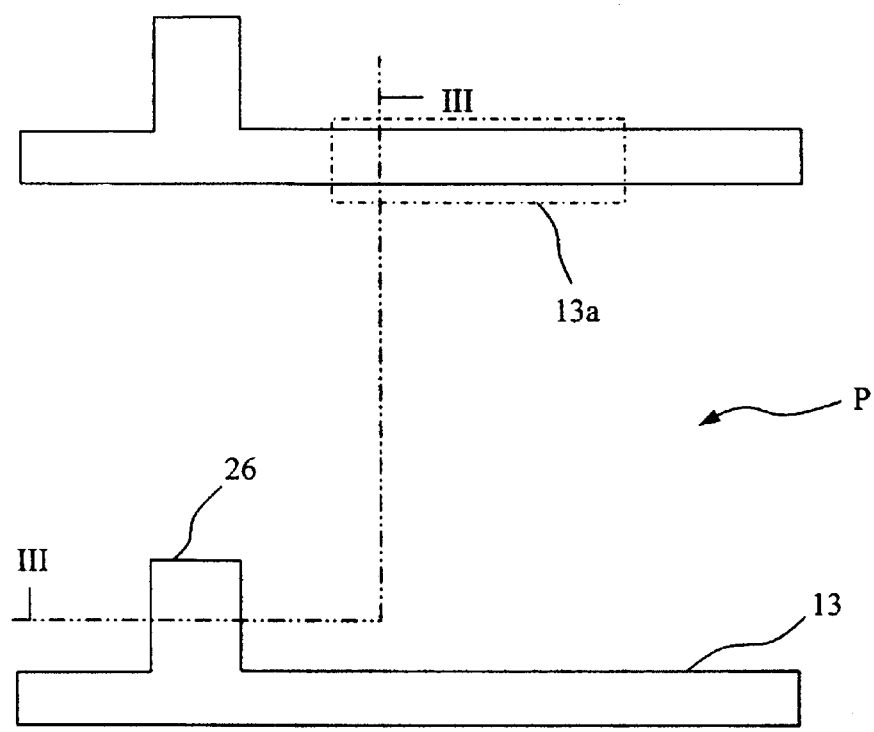
Figure 3B:
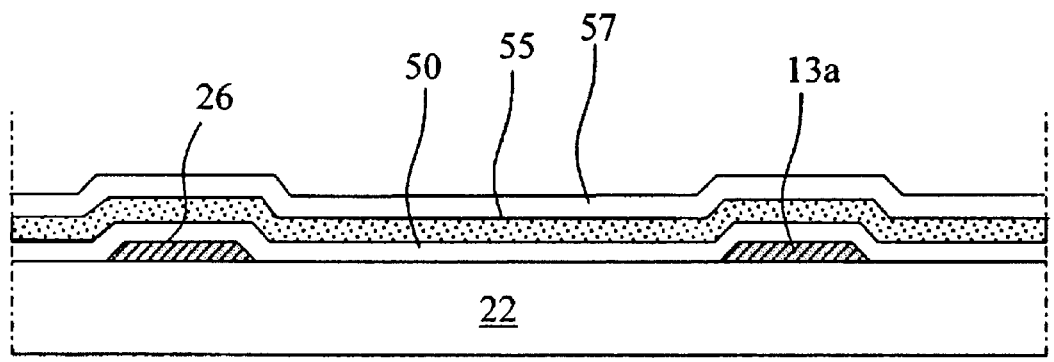
Figure 4A:
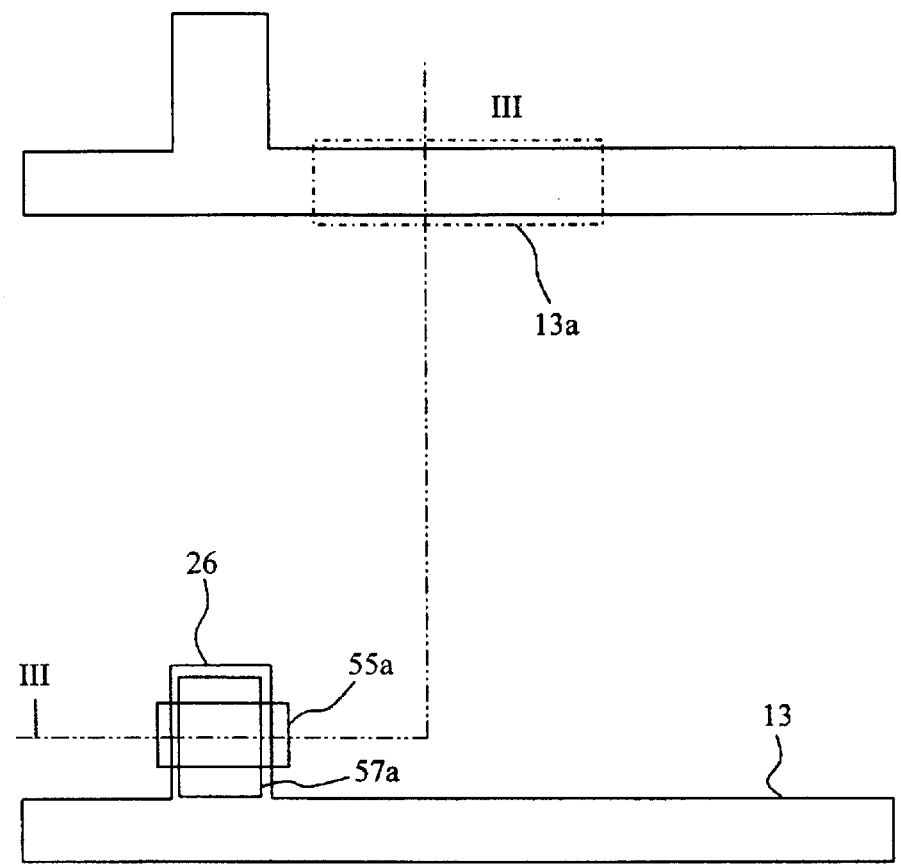
Figure 4B:
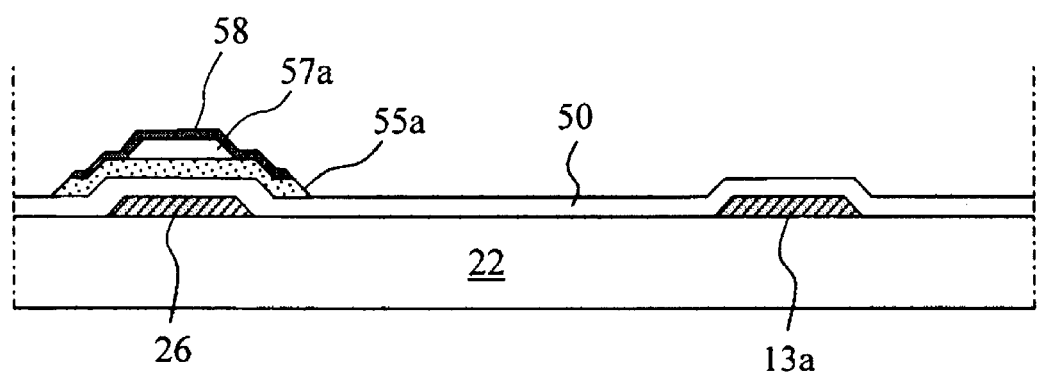
Figure 5A:
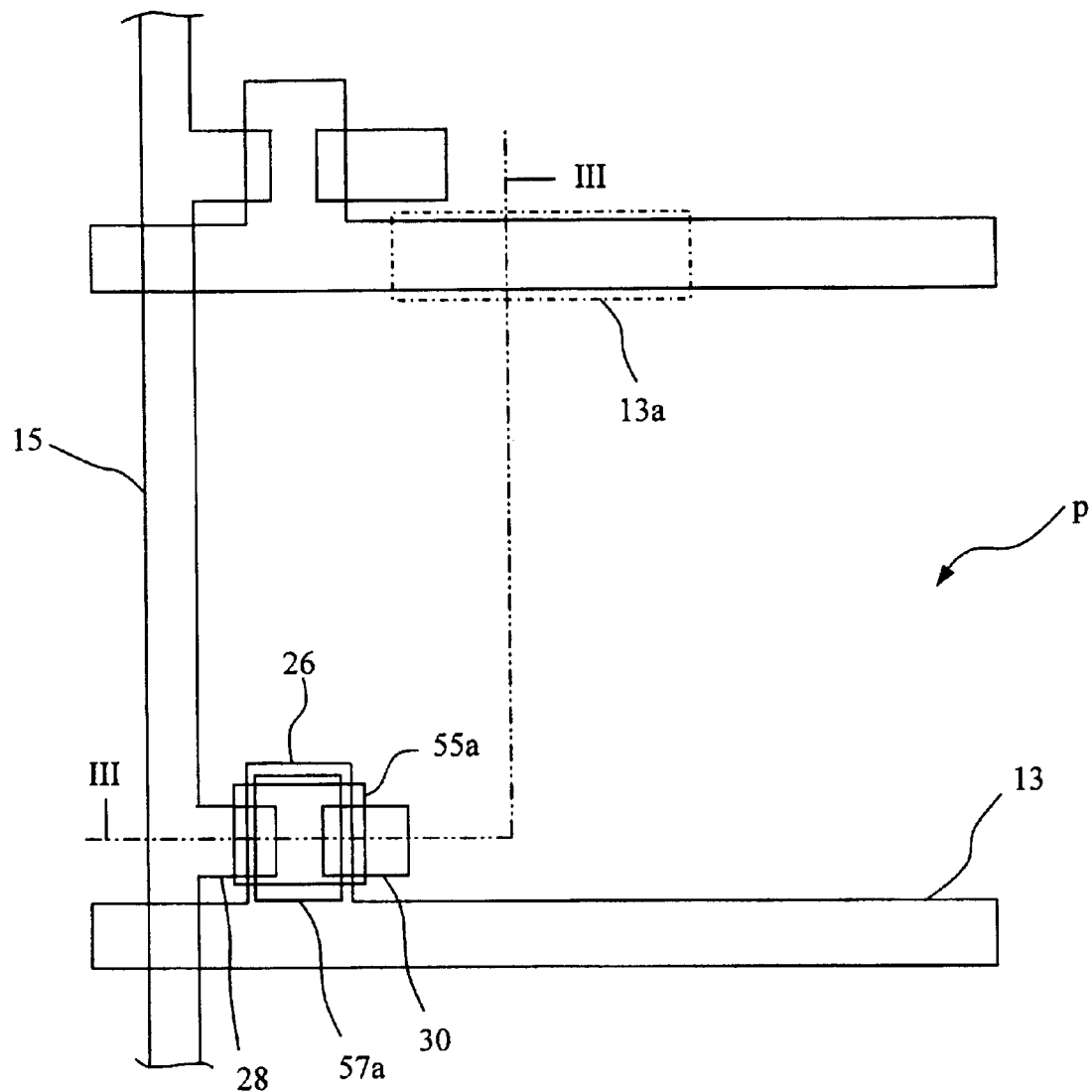
Figure 5B:
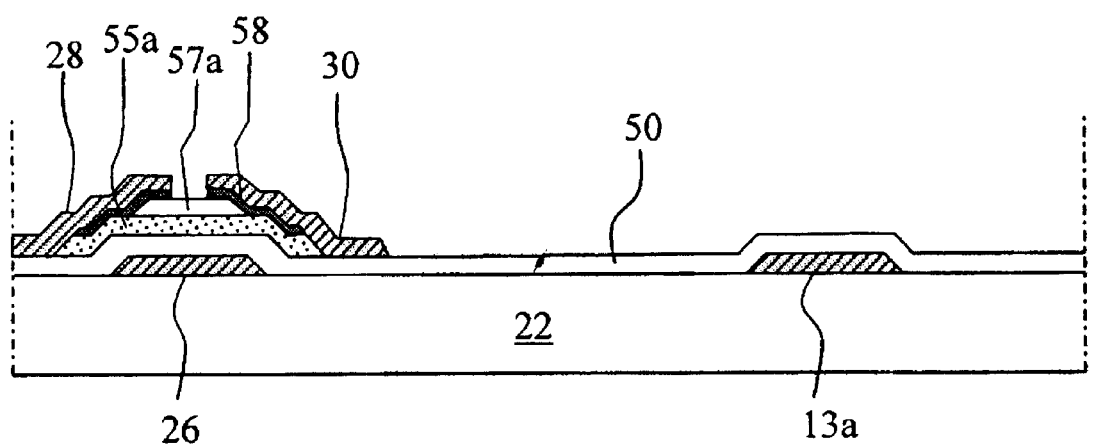
Figure 6A:
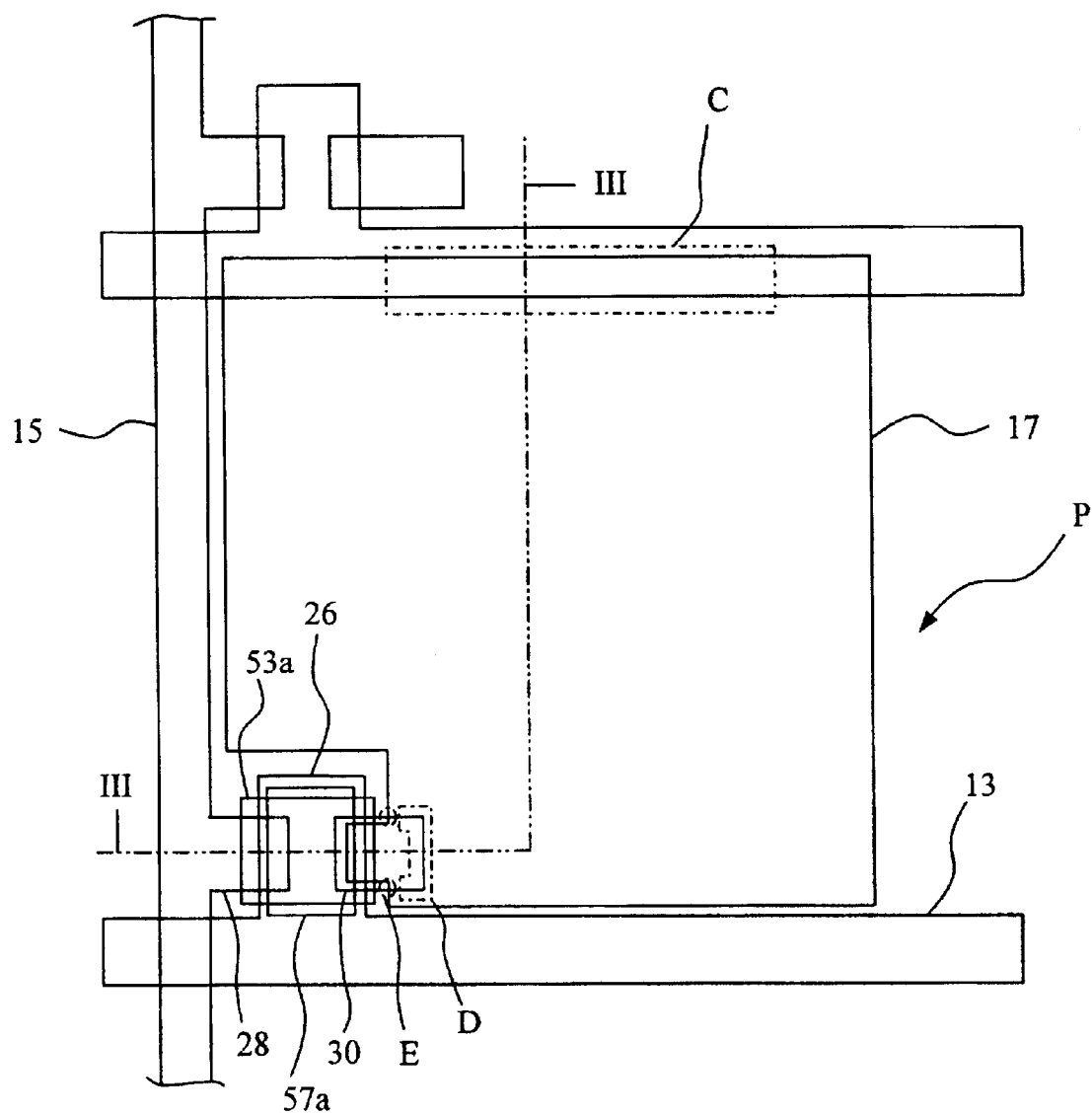
Figure 6B:
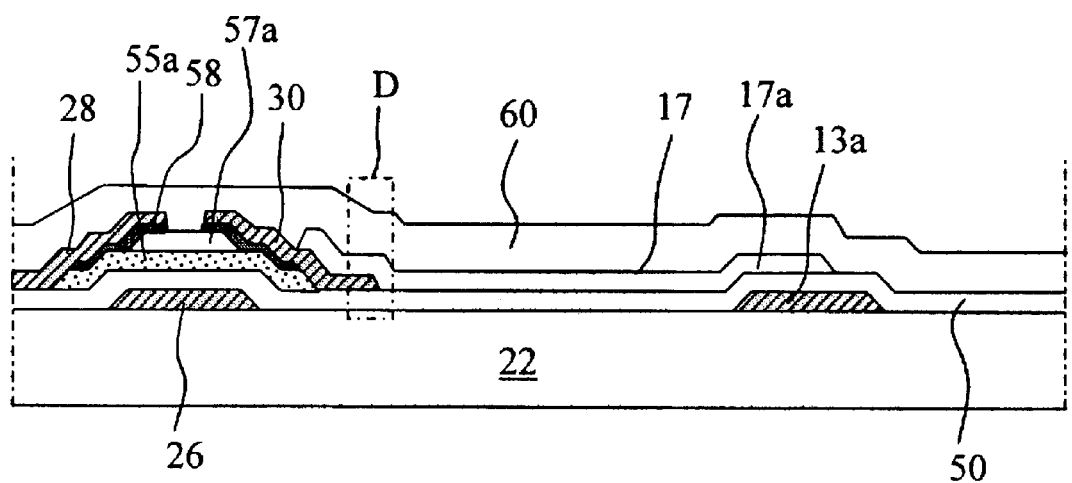
Figure 7A:
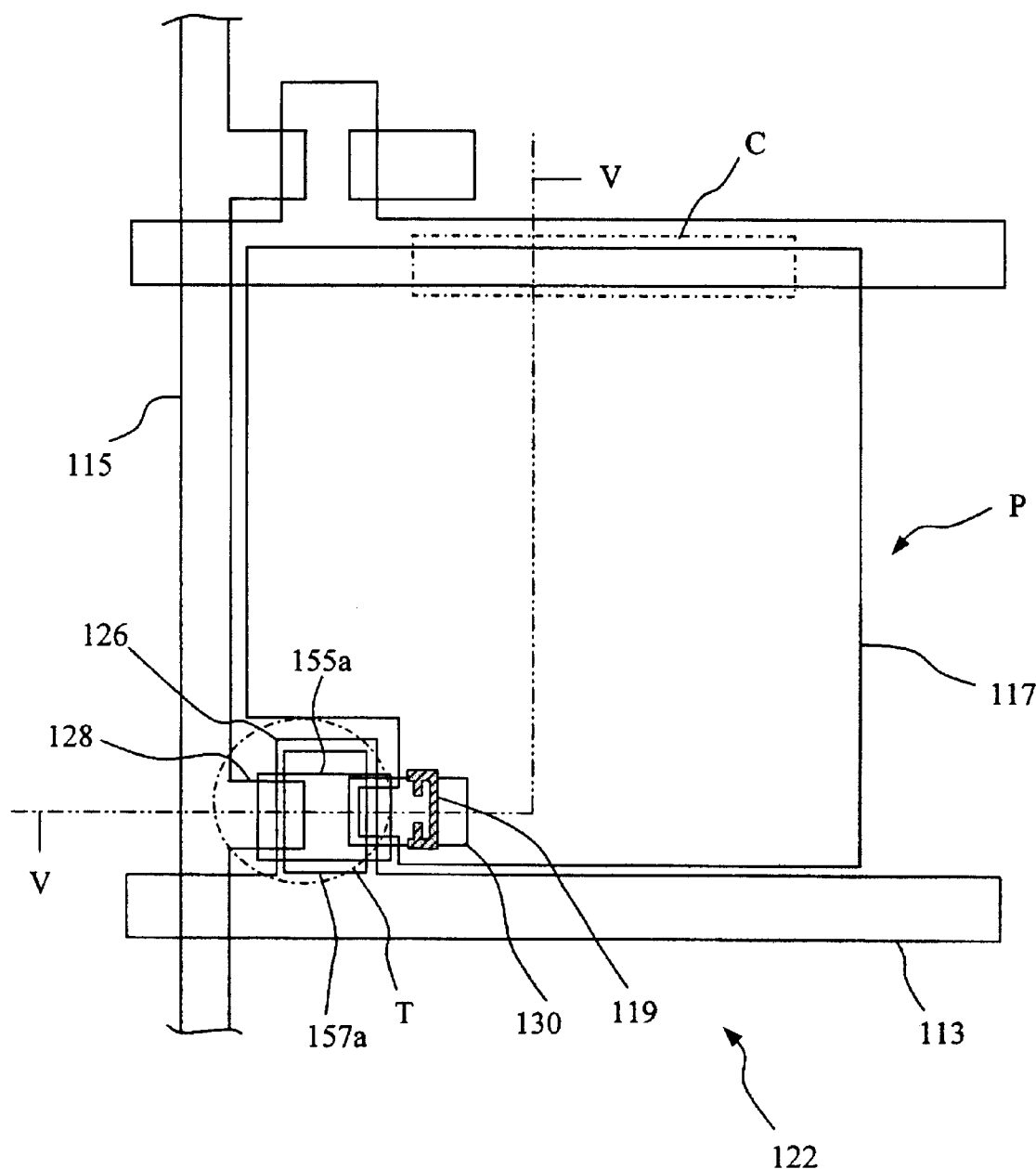
FIG. 7A is a plan view showing an array substrate of an LCD device according to the present invention.

FIG. 7A is a plan view showing an array substrate 122 of a LCD device according to an embodiment of the present invention. As shown, the array substrate 122 includes a pixel region "P" defined by crossing gate line 113 and data line 115 and within the pixel region "P" and the boundary thereof, a TFT "T", a pixel electrode 117, and a storage capacitor "C" are disposed. The storage capacitor "C" is electrically connected with the pixel electrode 117 such that a parallel circuit is formed therebetween.

The TFT "T" is an etch-stopper type. The etch-stopper type TFT "T" includes a gate electrode 126, a source electrode 128, a drain electrode 130, an active layer 155a, and a channel passivation layer 157a. The channel passivation layer 157a disposed upon the active layer 155a has an island shape and is made of an insulating material. The source electrode 128 electrically connects with the data line 115, whereas the gate electrode 126 electrically connects with the gate line 113.

Figure 7B:
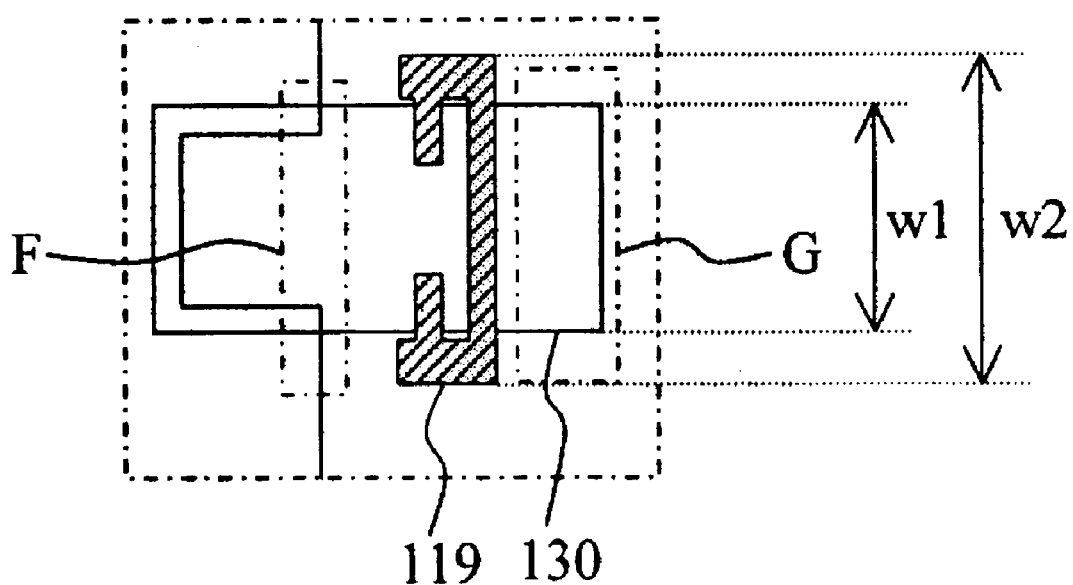
FIG. 7B is a partial expanded plan view of the array substrate of FIG. 7A.

The pixel electrode 117 overlaps and contacts an edge portion of the drain electrode 130. Across the overlapped edge portion of the drain electrode 130, a barrier 119 is formed in the same layer as the gate electrode 113. As shown in FIG. 7B, the barrier 119 has a second width "w2", which is greater than a first width "w1" of the drain electrode 130. Accordingly, when an etchant is used to form the pixel electrode 117, the barrier 119 serves to prevent the etchant from penetrating along an interval between the pixel electrode 117 and the drain electrode 130.

Figure 11A:
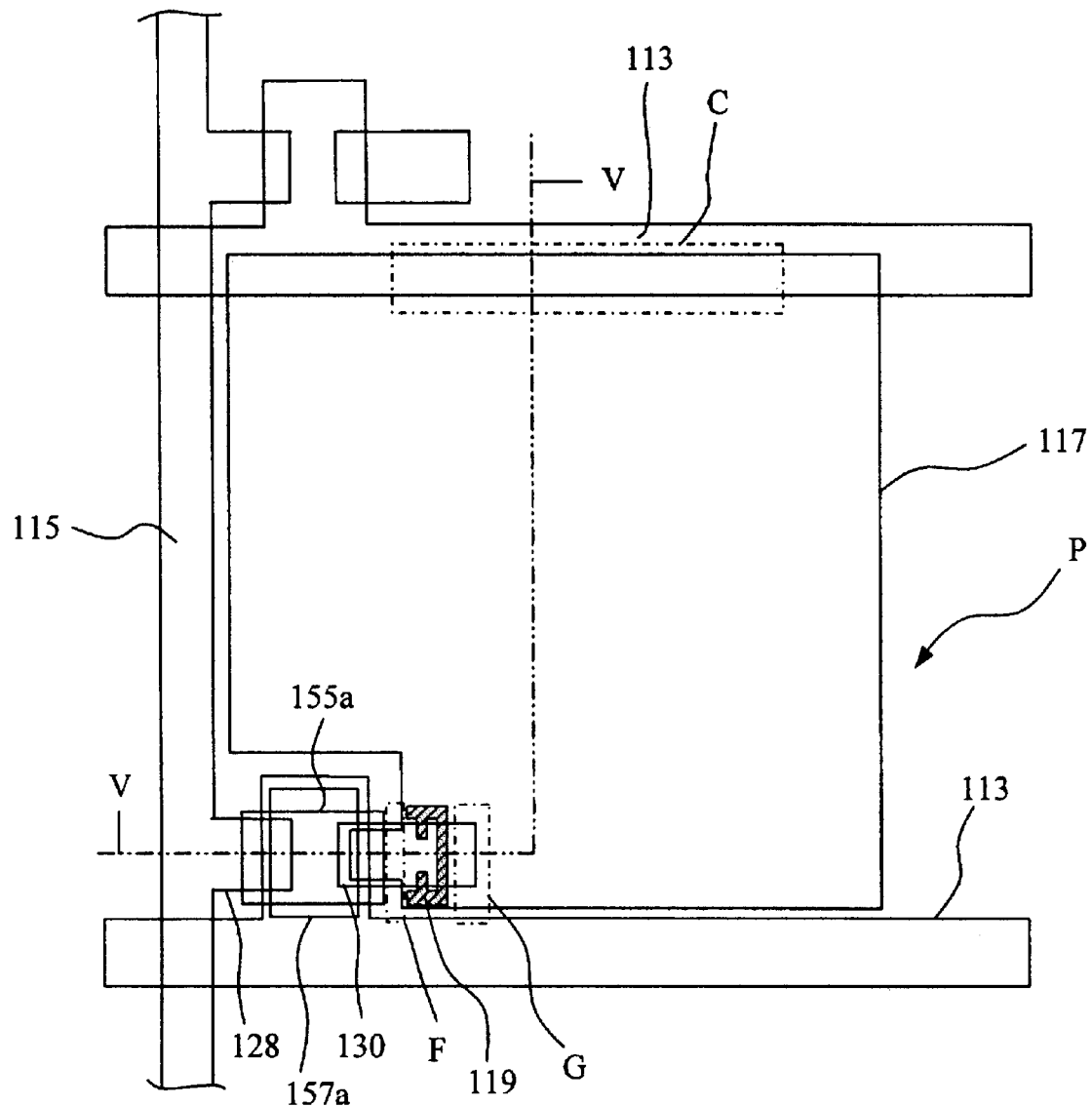
Figure 11B:
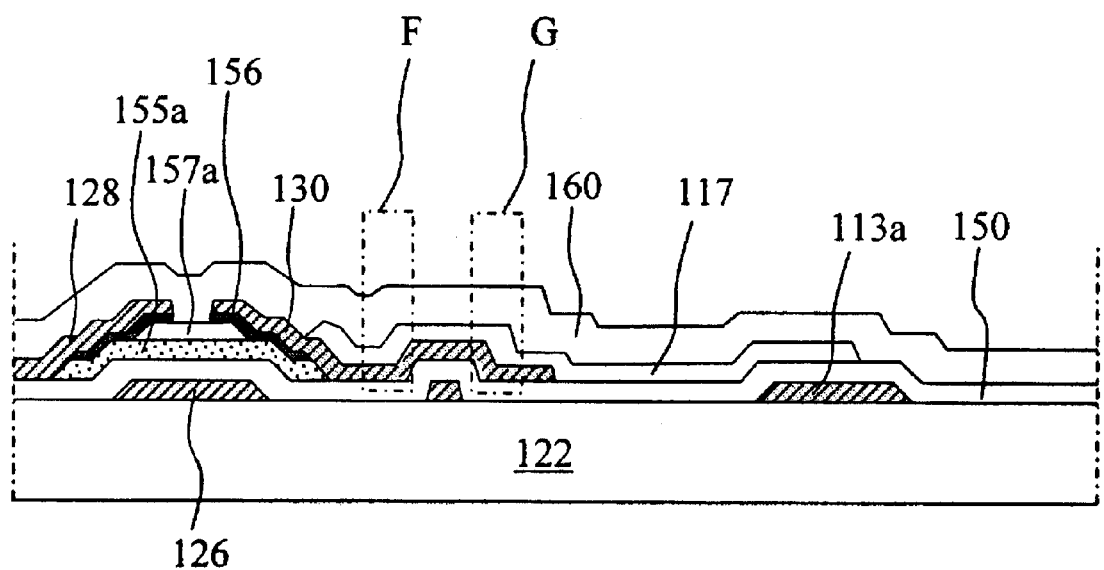

As shown in more detail in FIGS. 11A and 11B, there are a first boundary portion "F" and a second boundary portion "G" disposed between the drain electrode 130 and the pixel electrode 117. The first boundary portion "F" is disposed adjacent to the TFT "T", whereas the second boundary portion "G" is disposed within the pixel region "P." The barrier 119 is preferably disposed between the first boundary portion "F" and the second boundary portion "G." When an etchant is used for etching the pixel electrode 117, the etchant may flow along the interval between the pixel electrode 117 and the drain electrode 130 such that the etchant affects the pixel electrode 117 at the first boundary portion "F". However, inflow of the etchant is stopped due to the barrier 119, thereby protecting the pixel electrode 117 at the second boundary portion "G" from the penetrating etchant. Accordingly, although the pixel electrode 117 is over-etched at the first boundary portion "F" and is electrically separated from the drain electrode 130, the pixel electrode 117 and the drain electrode 130 are still electrically interconnected at the second boundary portion "G". Therefore, a surface contact between the drain electrode 130 and the pixel electrode 117 is not affected by the etchant during the etching for forming the pixel electrode 117.

Now, with reference to FIGS. 8A to 11A and FIGS. 8B to 11B, a process for fabricating the array substrate 122 according to an embodiment of the present invention is explained.

Figure 8A:
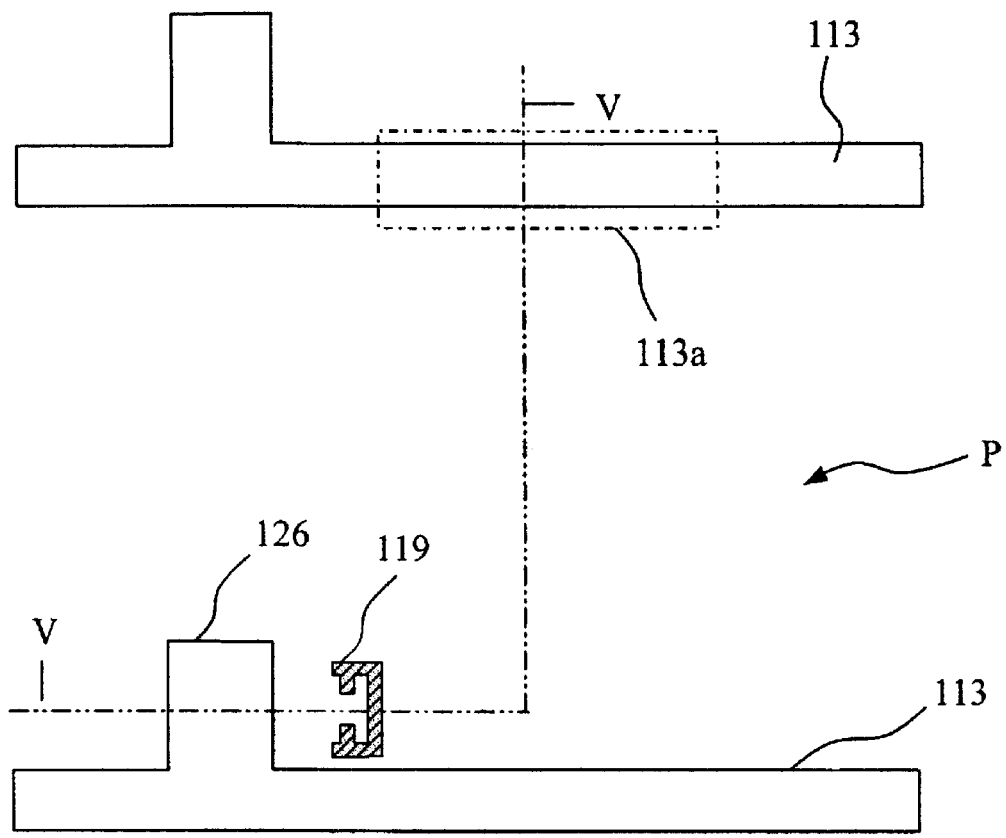
Figure 8B:
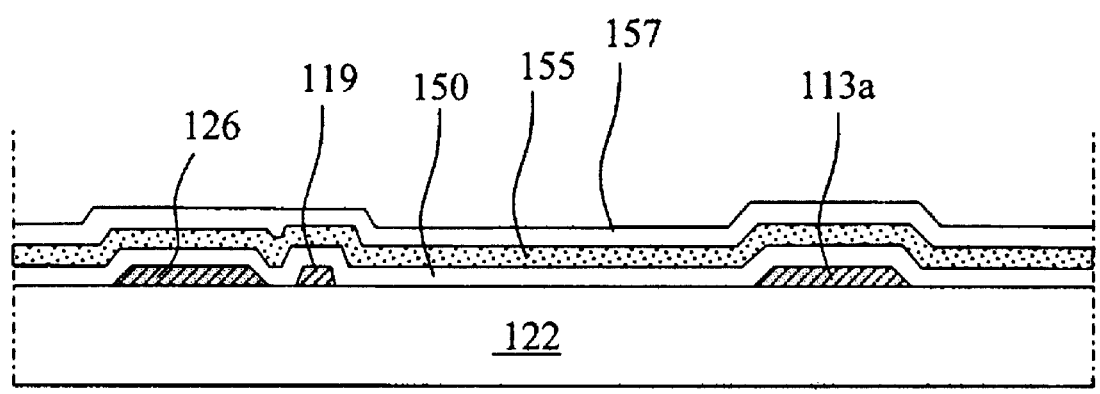

As shown in FIGS. 8A and 8B, a first metal layer is deposited upon an array substrate 122 and subsequently patterned to form a gate line 113, a gate electrode 126, and a barrier 119. The gate line 113 is disposed in a transverse direction upon the array substrate 122 and the gate electrode 126 is integrally formed with the gate line 113 and is perpendicular thereto. The barrier 119 is spaced apart from the gate electrode 126 and is disposed in a direction perpendicular to the gate line 113. As shown, first and second edges of the barrier 119 are bent at least two times toward the gate electrode 126 to define a groove. The groove is formed to open toward the gate electrode 126 and to close toward the pixel region "P" (in FIG. 7A). Additionally, a portion of the gate line 113 functions as a first capacitor electrode 113a of the storage capacitor "C" (in FIG. 7A).

Aluminum is widely used as a material with which to form the gate electrode 126 to decrease RC delay. However, pure aluminum, is chemically weak and may result in the formation of hillocks during high-temperature processing. Accordingly, instead of using pure aluminum, aluminum alloys or layered aluminum structures that include chromium (Cr), molybdenum (Mo), and tungsten (W) are used to form the gate electrode.

In FIGS. 8A and 8B, a gate insulating layer 150 is formed on the array substrate 122 covering the patterned first metal layer. The gate insulating layer 150 includes an insulating material such as an inorganic insulating material or an organic insulating material. The inorganic insulating material may include silicon oxide ($SiO_2$) or silicon nitride ($SiN_x$), for example. The organic insulating material may include benzocyclobutene (BCB) or an acryl-based resin. Subsequently, an amorphous silicon layer (a-Si:H) 155 and an insulating layer 157 are sequentially formed upon the gate insulating layer 150. The insulating layer 157 is made of the inorganic or organic insulating material, for example.

Figure 9A:
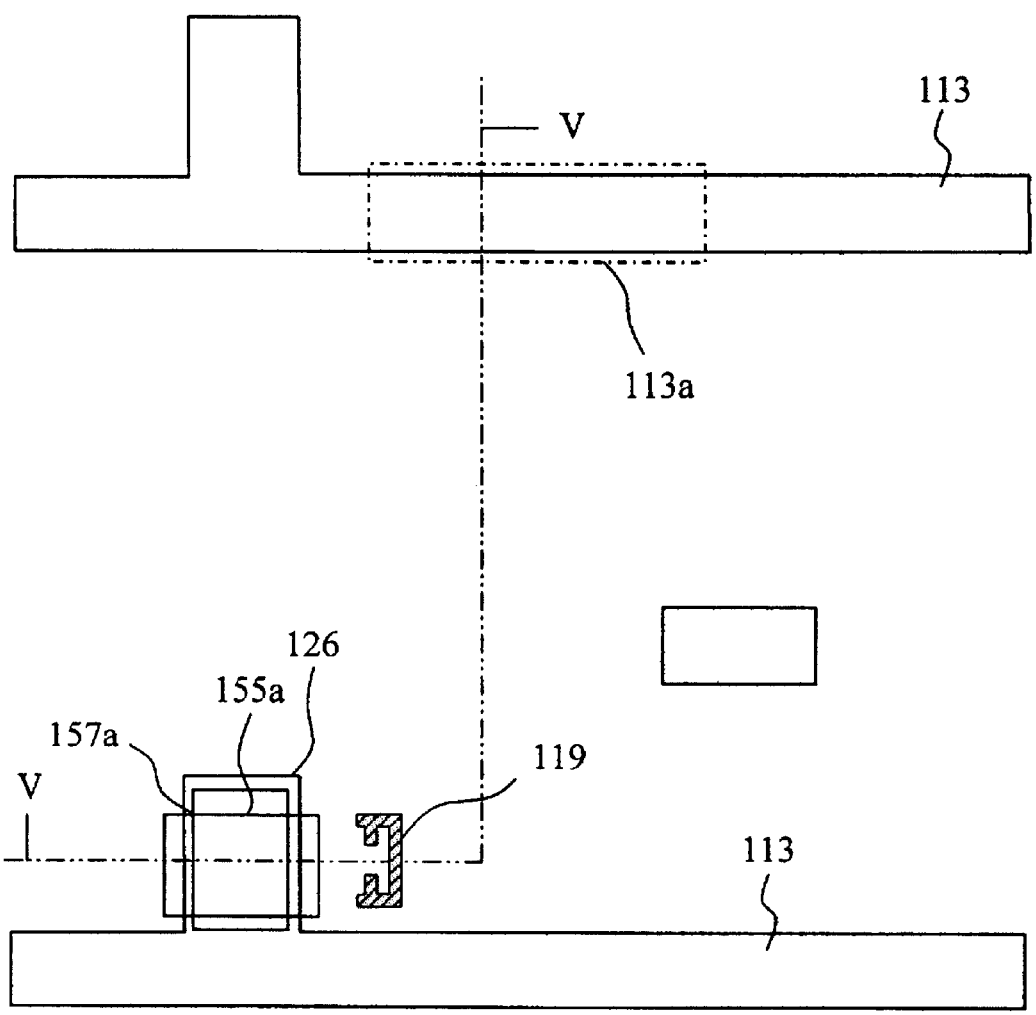
Figure 9B:
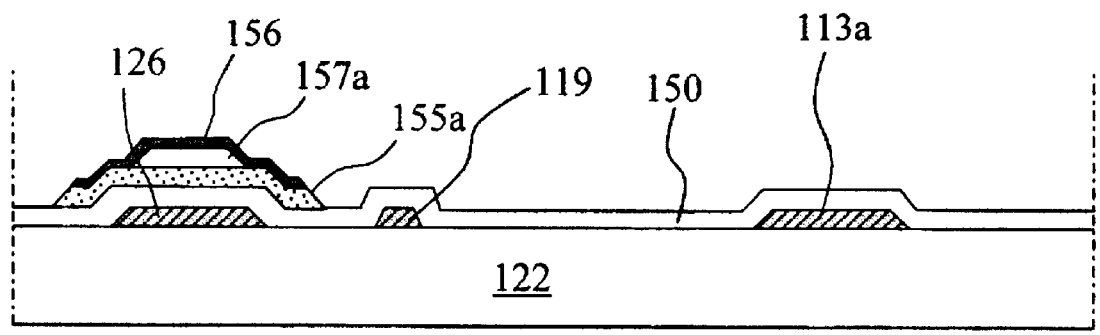

As shown in FIGS. 9A and 9B, the insulating layer 157 is patterned to form an island-shaped channel passivation layer 157a disposed over the gate electrode 126. Then, a doped amorphous silicon is deposited upon the amorphous silicon layer 155 to cover the channel passivation layer 157a. The doped amorphous silicon layer and the amorphous silicon layer 155 are patterned together to form an island-shaped ohmic contact layer 156 and active layer 155a disposed over the gate electrode 126.

Figure 10A:
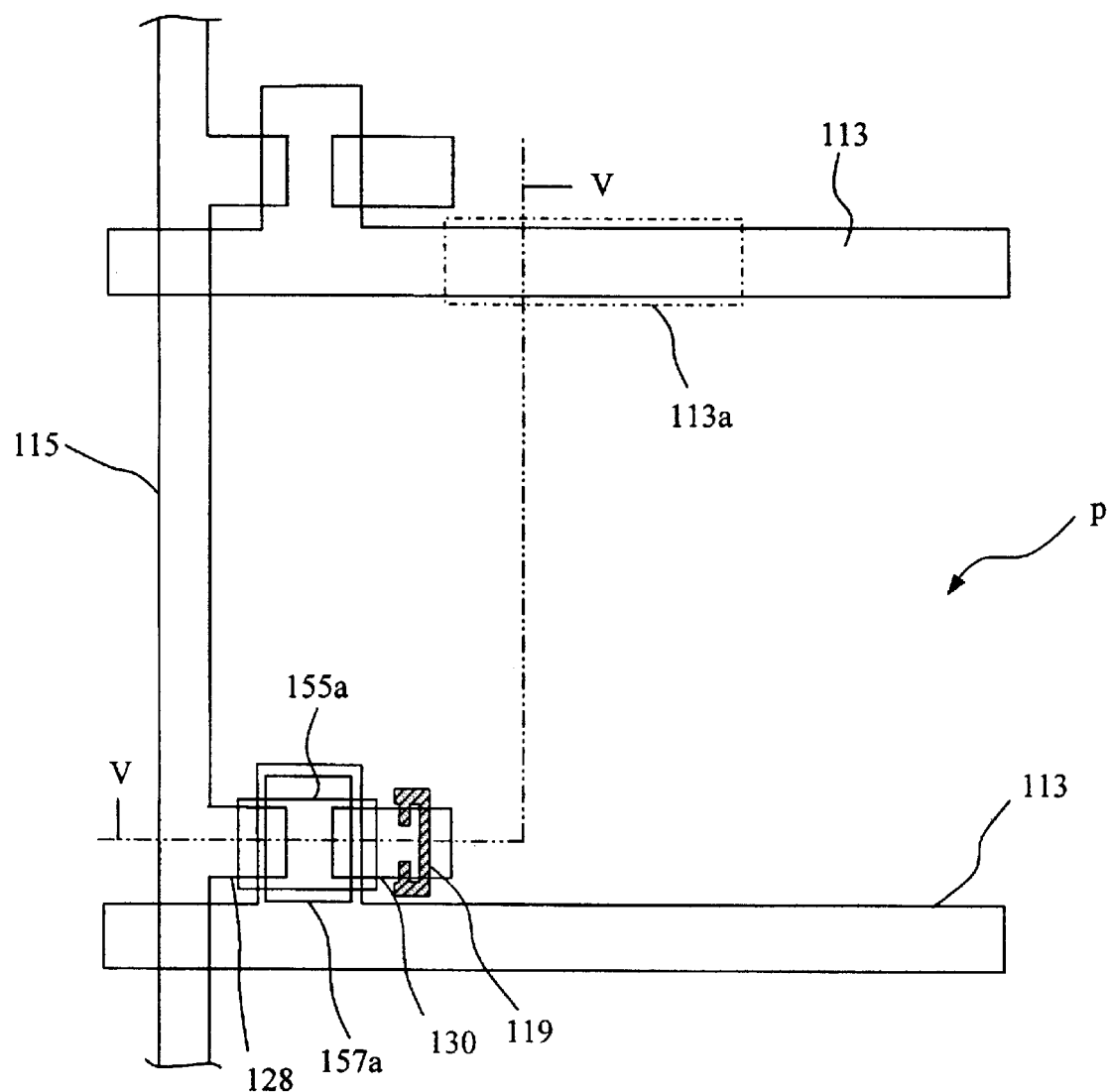
Figure 10B:
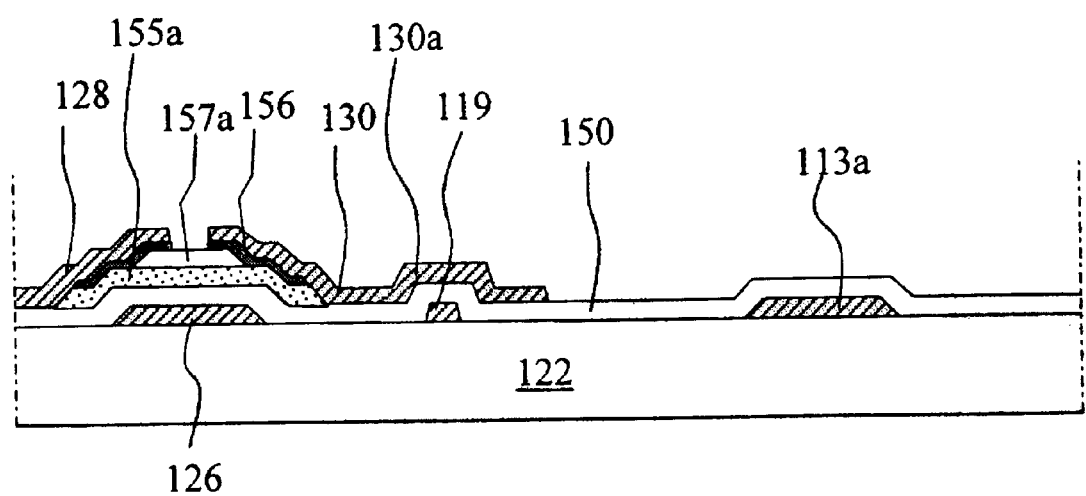

As shown in FIGS. 10A and 10B, a second metal layer is deposited upon the array substrate 122 and subsequently patterned to from the source electrode 128, the drain electrode 130, and the data line 115. The data line 115 crosses with the gate line 113 to define the pixel region "P." The source electrode 128 is integrally formed with the data line 115 in a direction perpendicular to the source electrode 128, and the drain electrode 130 is spaced apart from the source electrode 128. The drain electrode 130 crosses with the barrier 119 to form a stepped portion 130a formed in the drain electrode 130 due to the barrier 119. Then, a portion of the ohmic contact layer 156 is etched between the source electrode 128 and the drain electrode 130 to form a channel therebetween.

In FIGS. 11A and 11B, a transparent conductive material is deposited upon the array substrate 122 and subsequently patterned to form the pixel electrode 117 in the pixel region "P." The transparent conductive material is selected from a group at least indium tin oxide (ITO) and indium zinc oxide (IZO), for example. The pixel electrode 117 overlaps a portion of the drain electrode 130 to provide electrical interconnection with each other. Further, the pixel electrode 117 overlaps a portion of the first capacitor electrode 113 a such that the overlapping portion of the pixel electrode 117 functions as a second capacitor electrode of the storage capacitor "C." After the pixel electrode 117 is formed, a passivation layer 160 is formed on the array substrate 122 to cover the pixel electrode 117.

As previously described, an etchant is used to in a process to form the pixel electrode 117. During the process, the etchant may abnormally flow along the drain electrode 130 such that the pixel electrode 117 is over-etched at the first boundary portion "F." However, passage of the etchant is blocked due to the stepped portion 130a of the drain electrode 130 such that the pixel electrode 117 is protected from the etchant at the second boundary portion "G." Furthermore, although a portion of the pixel electrode 117 is electrically separated from the drain electrode 130 at the first boundary portion "F" due to the etchant, the pixel electrode 117 still electrically contacts the drain electrode 130 at the second boundary portion "G." Therefore, a conventional open-line defect between the drain electrode 130 and the pixel electrode 117 is prevented.

Figure 12A:
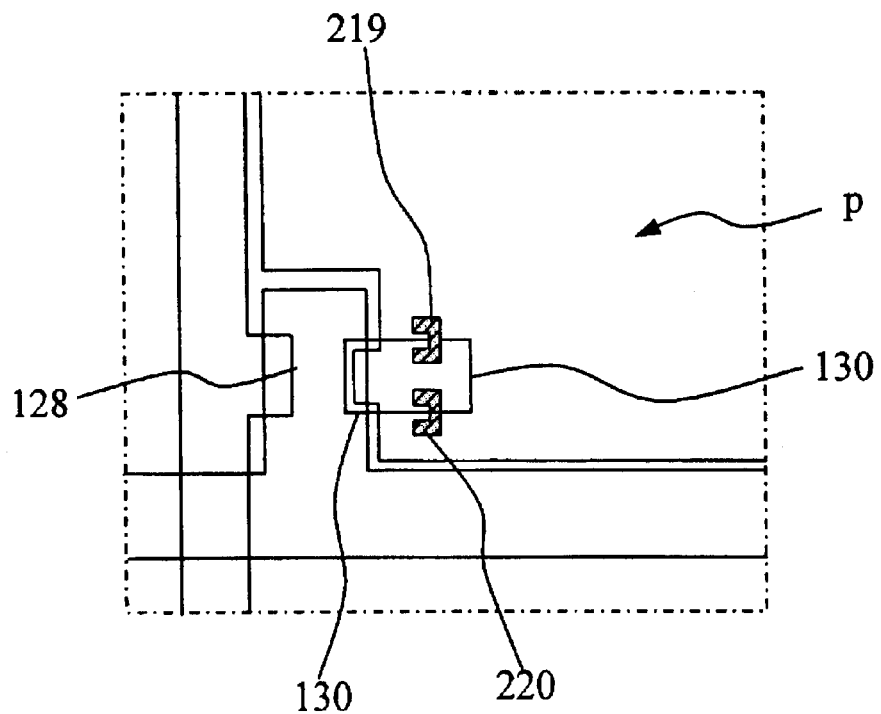
FIG. 12A is a plan view of another array substrate according to the present invention.
Figure 13A:
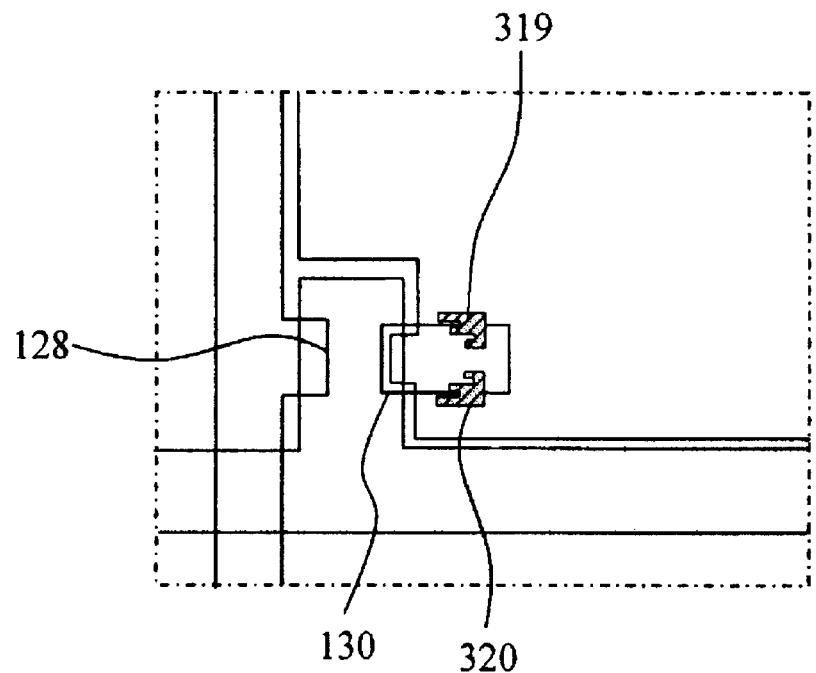
FIG. 13A is a plan view of another array substrate according to the present invention.

The barrier 119 structure may be modified as shown in FIGS. 12A and 13A.

Figure 12B:
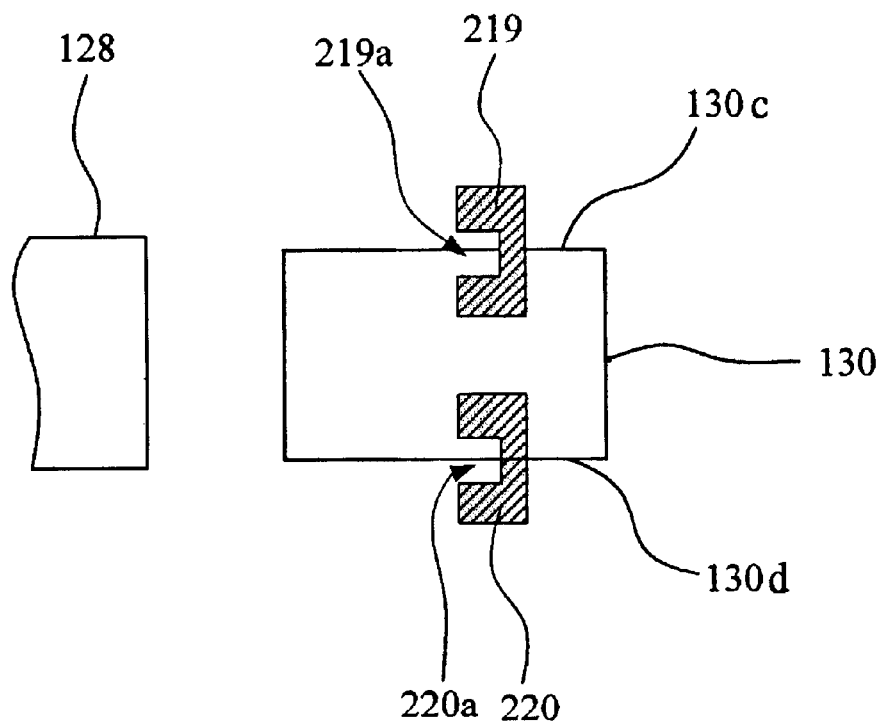
FIG. 12B is a partial expanded plan view of FIG. 12A.

In FIGS. 12A and 12B, a first sub-barrier 219 and a second sub-barrier 220 are substituted for the single barrier 119 (in FIG. 7B). The first sub-barrier 219 and the second sub-barrier 220 are disposed across a first side edge 130c and a second side edge 130d of the drain electrode 130, respectively. As shown, the first sub-barrier 219 and the second sub-barrier 220 have grooves 219a and 220a, respectively, that open toward the source electrode 128. Preferably, the grooves 219a and 220a are centered on the first side edge 130c and the second side edge 130d of the drain electrode 130, respectively. The first sub-barrier 219 and the second sub-barrier 220 prevent an etchant from flowing along the first and second side edges 130c and 130d of the drain electrode 130. Additionally, the grooves 219a and 220a serve to decrease an inflow speed of the etchant to maximize the effects of the sub-barriers 219 and 220.

Figure 13B:
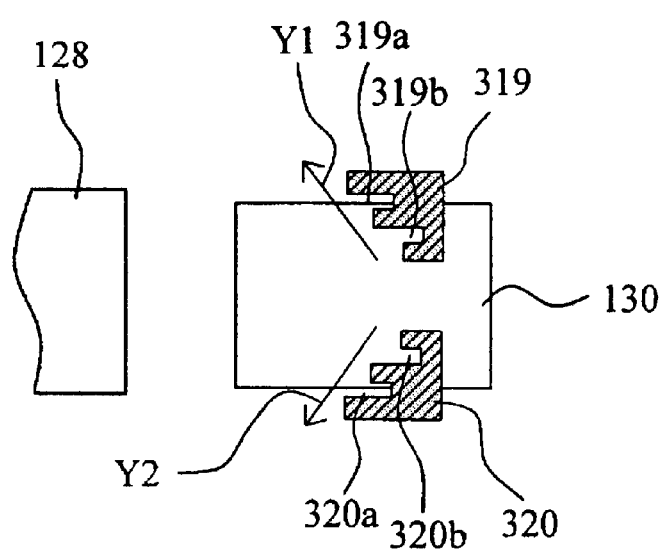
FIG. 13B is a partial expanded plan view of FIG. 13A.

Alternatively, as shown in FIGS. 13A and 13B, a first sub-barrier 319 and a second sub-barriers 320 may have a plurality of grooves. As shown in FIG. 13B, the first sub-barrier 319 and the second sub-barrier 320 have first grooves 319a and 319b and second grooves 320a and 320b, respectively, to increase the effect of the sub-barriers 319 and 320. Further, left side edges of the first sub-barrier 319 and the second sub-barrier 320 are slanted along first and second oblique lines "Y1" and "Y2," respectively, to improve the effects of the grooves.

It will be apparent to those skilled in the art that various modifications and variations can be made in the method of manufacturing a thin film transistor of the present invention without departing from the spirit or scope of the invention. Thus, it is intended that the present invention covers the modifications and variations of this invention provided they come within the scope of the appended claims and their equivalents.

What is claimed is:

1. An array substrate for a liquid crystal display device, the array substrate comprising:
   a substrate;
   a gate line including a gate electrode disposed on the substrate along a first direction;
   a data line disposed on the substrate along a second direction;
   a barrier disposed on the substrate and spaced apart from the gate electrode and the data line;
   a gate insulating layer disposed on the substrate, the gate line, the gate electrode, and the barrier;
   an active layer disposed on the gate insulating layer over the gate electrode;
   a source electrode disposed on the active layer;
   a drain electrode having a first portion disposed on the active layer opposite to the source electrode, and a second portion disposed on the insulating layer crossing over the barrier; and
   a pixel electrode electrically connected to the second portion of the drain electrode.

2. The array substrate according to claim 1, further comprising an island-shaped channel passivation layer disposed upon the active layer.

3. The array substrate according to claim 2, wherein the first portion of the drain electrode is disposed upon a portion of the island-shaped channel passivation layer.

4. The array substrate according to claim 1, wherein the barrier is formed of a same material as the gate line.

5. The array substrate according to claim 4, wherein the barrier is electrically isolated from the gate electrode.

6. The array substrate according to claim 1, wherein the barrier is disposed across side portions of the drain electrode.

7. The array substrate according to claim 6, wherein first and second edges of the barrier are bent at least two times such that a groove is defined opposite to the pixel region.

8. The array substrate according to claim 1, wherein the barrier includes a first sub-barrier disposed across a first side edge of the drain electrode and a second sub-barrier that is disposed across a second side edge of the drain electrode.

9. The array substrate according to claim 6, wherein each of the first and second sub-barriers has a groove that opens toward the source electrode.

10. The array substrate according to claim 1, wherein the first metal includes at least one of aluminum (Al), an aluminum alloy, chromium (Cr), molybdenum (Mo), and tungsten (W).

11. The array substrate according to claim 1, wherein the gate insulating layer and the channel passivation layer includes inorganic insulating materials.

12. The array substrate according to claim 11, wherein the inorganic insulating material includes at least one of silicon oxide ($SiO_2$) and silicon nitride ($SiN_x$).

13. The array substrate according to claim 1, wherein the gate insulating layer and the channel passivation layer include organic insulating materials.

14. The array substrate according to claim 13, wherein the organic insulating material is selected from a group including benzocyclobutene (BCB) and an acryl-based resin.

15. A method of fabricating an array substrate for a liquid crystal display device, the method comprising the steps of:
   forming a first metal layer including a gate line, a gate electrode, and a barrier upon a substrate, wherein the barrier is spaced apart from the gate electrode;
   forming a gate insulating layer to cover the first metal layer;
   forming an amorphous silicon layer upon the gate insulating layer;
   forming a doped amorphous silicon layer upon the amorphous silicon layer;
   forming both an island-shaped active layer from the amorphous silicon layer and an island-shaped ohmic contact layer from the doped amorphous silicon layer that are disposed over the gate electrode;
   forming a second metal layer including a data line, a source electrode, and a drain electrode, the drain electrode having a first portion disposed upon the ohmic contact layer and a second portion disposed upon the gate insulating layer and over the barrier; and
   forming a pixel electrode to overlap the second portion of the drain electrode such that the pixel electrode electrically contacts the drain electrode.

16. The method according to claim 15, further comprising:

forming an insulating layer upon the amorphous silicon layer; and patterning the insulating layer to form an island-shaped channel passivation layer disposed over the gate electrode.

17. The method according to claim 16, wherein the doped amorphous silicon layer deposited upon the amorphous silicon layer and the first portion of the drain electrode cover a portion of the channel passivation layer.

* * * * *